United States Patent
Killian et al.

(10) Patent No.: US 9,942,758 B2
(45) Date of Patent: *Apr. 10, 2018

(54) METHOD AND APPARATUS FOR PROVIDING RADIO COMMUNICATION WITH AN OBJECT IN A LOCAL ENVIRONMENT

(71) Applicant: AT&T Intellectual Property I, L.P., Atlanta, GA (US)

(72) Inventors: Thomas Killian, Brookside, NJ (US); Byoung-Jo Kim, Morganville, NJ (US); Christopher Rice, Parsippany, NJ (US); Nemmara K. Shankaranarayanan, Bridgewater, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,301

(22) Filed: Jun. 20, 2016

(65) Prior Publication Data

US 2016/0295411 A1    Oct. 6, 2016

Related U.S. Application Data

(63) Continuation of application No. 14/562,527, filed on Dec. 5, 2014, now Pat. No. 9,374,362, which is a continuation of application No. 12/619,616, filed on Nov. 16, 2009, now Pat. No. 8,914,628.

(51) Int. Cl.
*H04L 29/06* (2006.01)
*H04W 12/06* (2009.01)
*H04L 9/32* (2006.01)

(52) U.S. Cl.
CPC .......... *H04W 12/06* (2013.01); *H04L 9/3263* (2013.01); *H04L 63/08* (2013.01); *H04L 63/0823* (2013.01)

(58) Field of Classification Search
CPC ..... H04L 63/0823; H04L 63/08; H04W 12/06
USPC ........ 713/156, 155; 726/3, 4, 10, 27; 705/76
See application file for complete search history.

(56) References Cited

U.S. PATENT DOCUMENTS

| | | | |
|---|---|---|---|
| 5,745,701 A | 4/1998 | Nguyen et al. | |
| 6,374,357 B1 | 4/2002 | Mohammed et al. | |
| 7,062,555 B1* | 6/2006 | Kouznetsov | G06Q 20/027 705/79 |
| 7,533,257 B2 | 5/2009 | Lee | |
| 8,468,354 B2 | 6/2013 | Zhang | |
| 8,584,225 B1 | 11/2013 | Kennedy et al. | |
| 8,914,628 B2* | 12/2014 | Killian | H04L 63/0823 705/76 |
| 9,374,362 B2* | 6/2016 | Killian | H04L 63/0823 |
| 2002/0018569 A1 | 2/2002 | Panjwani et al. | |
| 2004/0002902 A1 | 1/2004 | Muehlhaeuser | |
| 2004/0093499 A1 | 5/2004 | Arditi | |

(Continued)

*Primary Examiner* — Sarah Su

(57) ABSTRACT

A method and apparatus for providing radio communication with an electronic object in a local environment are disclosed. For example the method receives via a mobile endpoint device of a user at least one first digital certificate associated with the local environment from a trusted source, and a second digital certificate from the electronic device deployed in the local environment via a wireless connection. The method then authenticates the electronic device using the at least one first digital certificate and the second digital certificate.

20 Claims, 4 Drawing Sheets

(56) References Cited

U.S. PATENT DOCUMENTS

| | | |
|---|---|---|
| 2006/0059342 A1 | 3/2006 | Medvinsky et al. |
| 2006/0064589 A1 | 3/2006 | Taniguchi et al. |
| 2006/0080527 A1 | 4/2006 | Novack et al. |
| 2006/0143458 A1 | 6/2006 | Tie et al. |
| 2006/0171540 A1 | 8/2006 | Lee et al. |
| 2006/0200666 A1 | 9/2006 | Bailey, Jr. |
| 2006/0242405 A1 | 10/2006 | Gupta et al. |
| 2008/0009265 A1* | 1/2008 | Fernandez-Alonso ............................ H04W 12/06 455/411 |
| 2008/0028206 A1* | 1/2008 | Sicard ................ H04L 63/0407 713/156 |
| 2008/0046716 A1 | 2/2008 | Eastlake et al. |
| 2008/0148044 A1 | 6/2008 | Upp et al. |
| 2008/0148374 A1 | 6/2008 | Spaur et al. |
| 2008/0209206 A1 | 8/2008 | Vaha-Sipila et al. |
| 2008/0222714 A1 | 9/2008 | Wahl |
| 2008/0244264 A1* | 10/2008 | Umezawa ........... H04L 63/0823 713/158 |
| 2009/0024845 A1 | 1/2009 | Benshetler |
| 2009/0037997 A1 | 2/2009 | Agbabian et al. |
| 2009/0327496 A1 | 12/2009 | Klemets et al. |
| 2010/0205429 A1 | 8/2010 | Alrabady et al. |
| 2011/0225427 A1 | 9/2011 | Wood et al. |
| 2012/0264375 A1 | 10/2012 | Shankaranarayanan |
| 2013/0205134 A1 | 8/2013 | Holtmanns et al. |
| 2014/0080450 A1 | 3/2014 | Gupta et al. |
| 2014/0134980 A1 | 5/2014 | Singh et al. |
| 2014/0181925 A1* | 6/2014 | Smith ..................... G06F 21/45 726/6 |

\* cited by examiner

METHOD AND APPARATUS FOR PROVIDING RADIO COMMUNICATION WITH AN OBJECT IN A LOCAL ENVIRONMENT

This application is a continuation of U.S. patent application Ser. No. 14/562,527, filed Dec. 5, 2014, now U.S. Pat. No. 9,374,362, which is a continuation of U.S. patent application Ser. No. 12/619,616, filed Nov. 16, 2009, now U.S. Pat. No. 8,914,628, all of which are herein incorporated by reference in their entirety.

The present invention relates generally to communication networks and, more particularly, to a method and apparatus for providing radio communication with an object in a local environment.

BACKGROUND OF THE INVENTION

The need for mobility has led to proliferation of wireless devices of various forms. For example, customer endpoint devices, e.g., wireless phones, laptop computers, etc., can be used for accessing network services from any location via wireless networks. However, the customer may need to communicate with a local network rather than a trusted network (e.g. the customer's service provider) over the Internet.

From the network perspective, security measures may exist to ensure that the customer's identity is authenticated. For example, the customer may be required to supply a password, etc. prior to being allowed to access a local network. However, from the customer perspective, the customer is unable to know whether or not a local electronic device that the customer is communicating with is authentic. For example, the customer endpoint device may detect a signal from a local electronic device whose identity the customer is unable to affirm. For instance, the customer may be at an airport and may wish to communicate with a local electronic device, e.g., a device being used as an airport gate agent. However, when the customer's endpoint device detects the radio signal from the local electronic device, the customer may not be sure of the authenticity of the local electronic device. For example, in fact the signal may be from an unauthorized device that is attempting to establish unauthorized communication. Hence, the customer is unable to trust the local electronic device and will be unwilling to enter sensitive information such as a password, an identification number, a credit card number, etc.

SUMMARY OF THE INVENTION

In one embodiment, the present invention disclosed a method and apparatus for providing radio communication with an electronic object in a local environment. For example the method receives via a mobile endpoint device of a user at least one first digital certificate associated with the local environment from a trusted source, and a second digital certificate from the electronic device deployed in the local environment via a wireless connection. The method then authenticates the electronic device using the at least one first digital certificate and the second digital certificate.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing radio communication (broadly wireless communication) with an electronic object in a local environment. Although the present invention is discussed below in the context of wireless networks, the present invention is not so limited. Namely, the present invention can be applied on all networks including wired networks that would benefit from communication with local objects.

Figure 1:
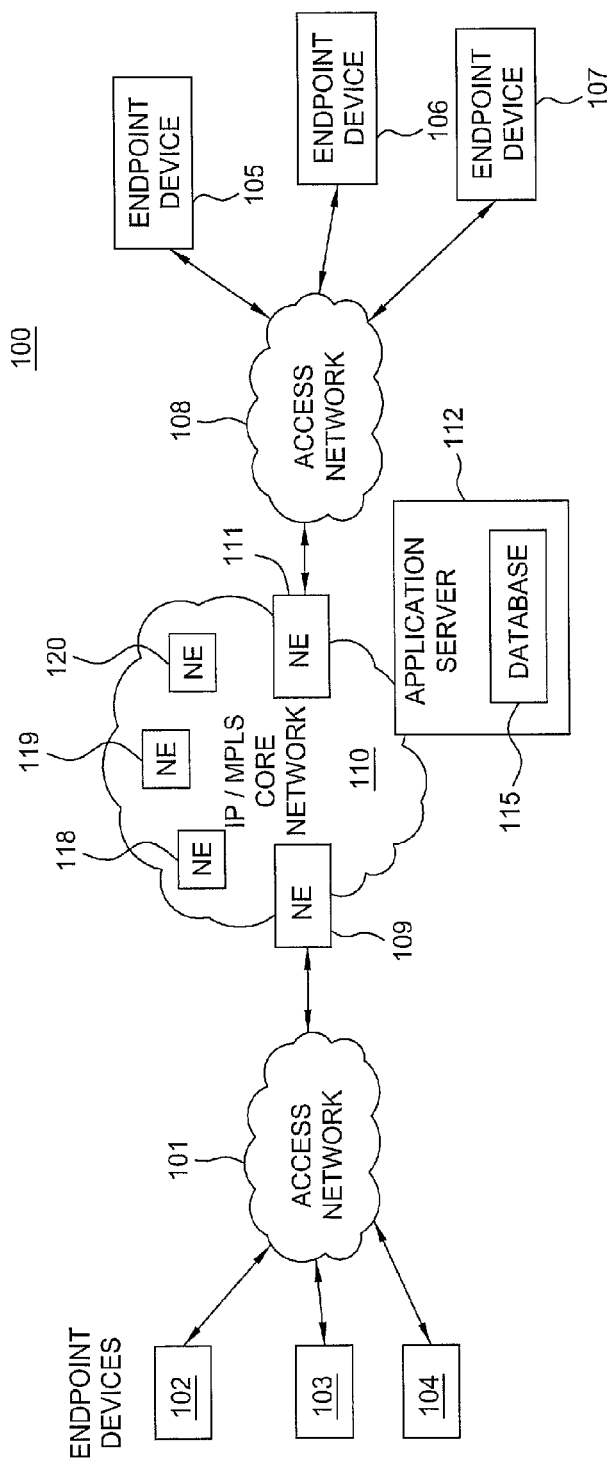
FIG. 1 illustrates an exemplary network for providing radio communication with an object in a local environment related to the present invention.

FIG. 1 illustrates an exemplary network 100 for accessing a service related to the present invention. Exemplary networks include Internet protocol (IP) networks, Public Switched Telephone Networks (PSTN), wireless networks, access networks, and the like. An IP network is broadly defined as a network that uses Internet Protocol such as IPv4 or IPv6 to exchange data packets.

In one embodiment, the network may comprise a plurality of endpoint devices 102-104 configured for communication with the core network 110 (e.g., an IP based core backbone network supported by a service provider) via an access network 101. Similarly, a plurality of endpoint devices 105-107 are configured for communication with the core network 110 via an access network 108. The network elements 109 and 111 may serve as gateway devices, e.g., servers or edge routers for the network 110.

The endpoint devices 102-107 may comprise endpoint devices such as personal computers, laptop computers, Personal Digital Assistants (PDAs), servers, routers, wire-based phones, wireless phones, smart phones and the like.

The access networks 101 and 108 serve as a conduit to establish a connection between the endpoint devices 102-107 and the NEs 109 and 111 of the IP core network 110. The access networks 101 and 108 may each comprise a Digital Subscriber Line (DSL) network, a broadband cable access network, a Local Area Network (LAN), a wireless local area network (WLAN), a Wireless Access Network (WAN), a cellular network, a 3$^{rd}$ party network, and the like. The access networks 101 and 108 may be either directly connected to NEs 109 and 111 of the IP core network 110, or indirectly through another network.

A wireless access network 101 or 108 may support a wireless service, e.g., Wi-Fi (Wireless Fidelity), WiMAX (Worldwide Interoperability for Microwave Access), 2G, 3G, or LTE (Long Term Evolution) or other 4G wireless services, and the like. Broadly defined, Wi-Fi is a wireless local area network (WLAN) technology based on the Institute of Electrical & Electronics Engineers (IEEE) 802.11 standards. WiMAX is a wireless metropolitan area network (MAN) technology based on the Institute of Electrical & Electronics Engineers (IEEE) 802.16 standards. 2G is a second generation cellular network technology, 3G is a third generation cellular network technology, and 4G is a fourth generation cellular network technology. Global System for Mobile (GSM) communications is an example of a 2G cellular technology, Universal Mobile Telecommunications System (UMTS) is an example of a 3G cellular network technology, and an LTE is an example of a 4G cellular network technology. It should be noted that the present invention is not limited to a particular type of wireless service.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP core network 110 also comprises an application server 112 that contains a database 115. The application server 112 may comprise any server or computer that is well known in the art, and the database 115 may be any type of electronic collection of data that is also well known in the art. It should be noted that although only six endpoint devices, two access networks, five network elements, one application server are depicted in FIG. 1, the communication system 100 may be expanded by including additional endpoint devices, access networks, border elements, application servers without altering the scope of the present invention.

The above IP network is only described to provide an illustrative environment in which packets for various services are transmitted on networks. In one embodiment, a customer (broadly a user) may wish to access services from a variety of locations over wireless networks. For example, a user may have a need for mobility while being able to access services. The need for mobility may necessitate accessing services via wireless (mobile) customer endpoint devices over a radio connection with a local electronic device. However, when a user initiates communication over a radio connection, the user is often unable to confirm the identity of the local electronic device with which the communication occurs. For example, the radio signal may be received from an unauthorized device for the purpose of enticing the customer to provide personal information such as passwords. For example, a traveler at an airport may wish to confirm travel arrangement by communicating with a local electronic device of the airlines. However, when the customer initiates the communication, the signal that the customer's device receives may be from another unauthorized device (e.g., deployed near an authorized device), pretending to be a device that belongs to the airlines. The customer may then unknowingly disclose personal or protected information to the unauthorized device.

In one embodiment, the current invention provides a method and apparatus for providing radio communication (broadly wireless communication) with an electronic object in a local environment in a secure manner. It should be noted that wireless communication is not limited to radio communication, but may comprise other wireless communication such as optical signal communication and the like. For example, the local environment (broadly a local geographic area) may be an airport, a stadium, a hospital, a bank, an office building and the like, and the electronic object that the customer wishes to communicate with may be an electronic gate agent, an automated check-in counter, an automated ticket system, a security system and the like. In one embodiment, the communication with the electronic object is via a radio signal or connection.

In one embodiment, the method first optionally loads information that may be accessed via a radio connection into the customer's endpoint device. For example, the method may load an electronic ticket (e.g., an airlines ticket, a sports event ticket, a prescription, medical records, financial information, passwords, and the like) into the customer's endpoint device (e.g., a smart device such as a smart phone, a mobile phone, and the like). For example, the customer may be planning to access an electronic ticketing system at the airport using a cell phone. Thus, the electronic ticket information may then be loaded in advance into the cell phone.

In one embodiment, the method receives a first digital certificate pertaining to a local environment from a trusted authority (broadly a trusted source). In one embodiment, the trusted source is not the local environment itself. Namely, the trusted source is deployed physically remote from the local environment. For example, the method can receive authentication of the local environment, e.g., an airport, a stadium, a hospital, etc., from the customer's network service provider, e.g., an application server deployed within the network 110 as disclosed above. Thus, a single centralized trusted source may store a plurality of first digital certificates for a plurality of local environments, thereby alleviating the burden from the customer having to seek out the proper authority to obtain the pertinent first digital certificate. In one example, the local environment may have a digital certificate that contains the public key of the local environment, e.g., a public key of the airport that the customer will be traveling to.

Subsequently, the method may then receive a second digital certificate from a local electronic device deployed at the local environment via radio communication. For the example above, the customer travels to the airport and the customer's mobile endpoint device starts to detect radio signals from various electronic devices deployed locally at the airport. For example, the airlines may employ various electronic objects in the local environment that are given digital certificates of authentication. Thus, the electronic objects have established a trust relationship with the airport. In turn, the airport may have established a trust relationship with the customer's network service provider. The chain of trust relationships can then be used to enable the customer to communicate with an electronic object in the local environment in a secure manner.

In other words, an application server, e.g., deployed at the customer's network service provider, can be used to provide a digital certificate for authentication of the airport. The airport provides digital certificates locally to the authorized local electronic objects that include a modem for communicating with customers wirelessly. In this illustrative example, the local environment (e.g., the airport) has a trusted relationship with the service provider. The various local electronic devices have a trusted relationship with the local environment. Hence, the customer can rely upon the trusted relationship to ensure that the communication is taking place in a trusted manner and the radio communication is with an authenticated object. In this illustrative example, the customer may be deemed to be a subscriber of at least one service (e.g., VoIP service, Internet access service, email service, and the like) of the network service provider.

In operation, a customer mobile endpoint device obtains the second digital certificate from an electronic object in the local environment prior to initiating a communication with the local electronic object, such as providing personal or confidential information to the local electronic object. For example, if a customer is planning to initiate a radio communication with a local electronic device that is part of an airport network, then the customer mobile endpoint device must first obtain the second digital certificate from the local electronic device when the customer arrives at the airport.

Once the local electronic device has presented its digital certificate (e.g., the second digital certificate), the customer mobile endpoint device will use the previously received digital certificate from the customer's network service provider (e.g., the first digital certificate) to authenticate the local electronic device. Thus, the customer's mobile endpoint device uses the two digital certificates as a means for verifying that the local electronic device has a trusted relationship with the local environment and that the local environment has a trusted relationship with the network service provider. If the local electronic device in the local environment is successfully authenticated, then the customer may interact with the local electronic device. For example, the customer may present an electronic ticket (e-ticket) to obtain a boarding pass, present an electronic ticket (e-ticket) to attend a sports event or a concert at a stadium or arena, request a change to an e-ticket, to submit medical records to a hospital, to submit financial information to a bank, and so on.

Figure 2:
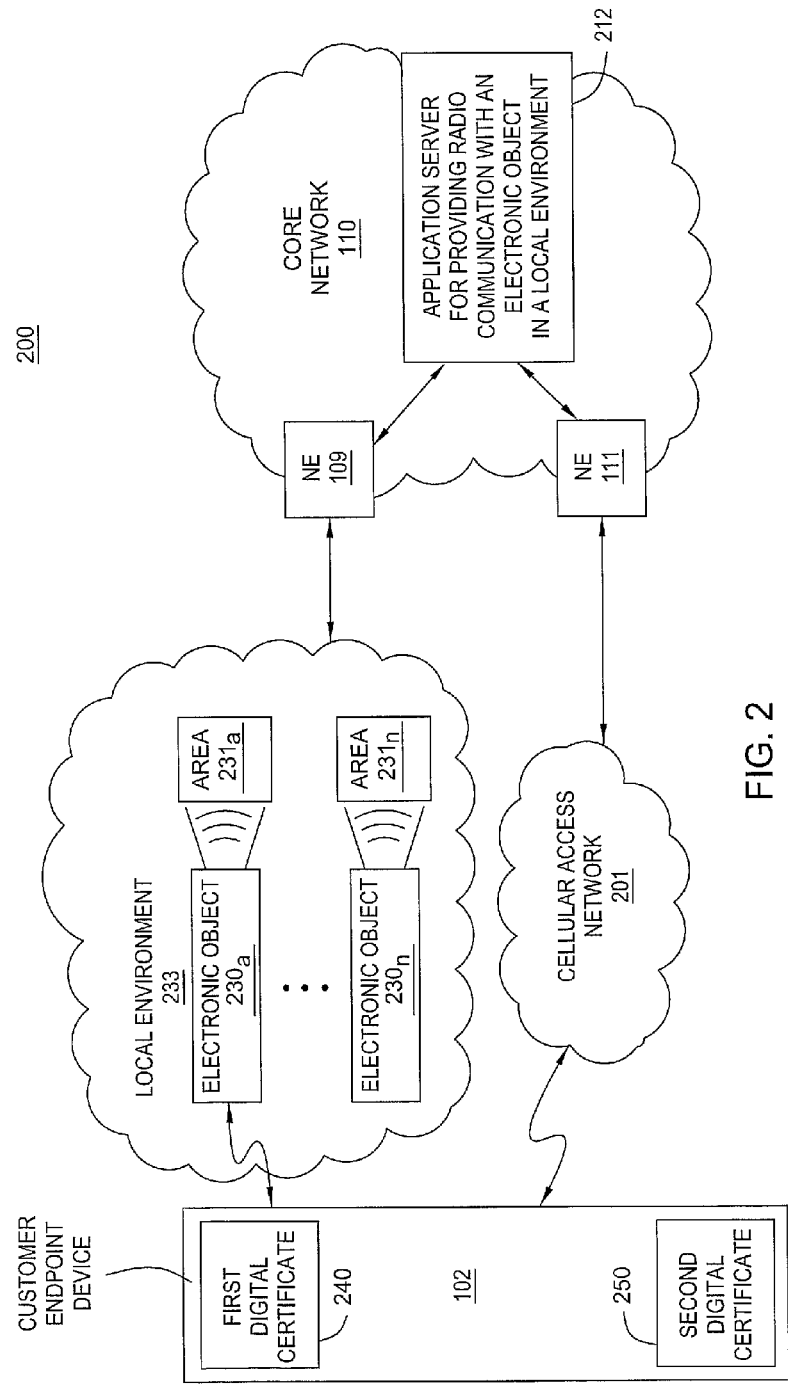
FIG. 2 illustrates an exemplary network for providing radio communication with an object in a local environment.

In one embodiment, the local electronic device can be engineered to present the second digital certificate in a focus manner. In other words, it would be beneficial for a local electronic device to limit its broadcast to a limited geographic area. For example, a local electronic device deployed at Gate 101 should limit its broadcast to a geographic area local to Gate 101 (e.g., 231*a* as shown in FIG. 2), whereas Gate 91 should limit its broadcast to a geographic area local to Gate 91 (e.g., 231*n* as shown in FIG. 2). Namely, a user at Gate 91 may not be interested in receiving any information from a local electronic device deployed at Gate 101.

In one embodiment, the customer may obtain the first digital certificate(s) of the local environment by downloading a list of relevant certificates before reaching the local environment. For example, the customer may download a certificate of a specific airport before going to the specific airport. In fact, there may be a plurality of first digital certificates for the airport, e.g., one unique certificate for each airline operating flights from the airport.

In one embodiment, the customer may obtain the first digital certificate on-demand when the digital certificate is needed. For example, the customer may obtain the first digital certificates shortly before such a certificate is needed. For example, the customer may be able to receive valid certificates by communicating with the application server of a network service provider via a mobile phone. For example, the customer may place a call or a request to a predetermined phone number (e.g., an 8XX number). Upon request from the customer, the application server will provide the valid digital certificates for a local environment to the customer's endpoint device. For example, in one embodiment, the request may include current Global Positioning System (GPS) information of the customer's mobile phone. In turn, the application server may present a number of available digital certificates given the customer's current location.

In one embodiment, the digital certificates may be provided in a predetermined format. For example, valid certificate numbers at Airport X are No. mmmm, nnnn, and pppp, and so on, wherein mmmm, nnnn, and pppp represent alphanumeric characters. Note that the particular alphanumeric characters are not intended to restrict the implementation of the current invention.

In one embodiment, the digital certificates (e.g., first and/or second digital certificates) may have a predetermined time period of validity. For example, it may be desirable to change the certificate numbers on a daily basis, on an hourly basis and so on, to increase the robustness of the security. For example, an airport may require that the digital certificates be changed regularly to ensure that boarding passes are not illegally obtained. Similarly, a stadium may require that the digital certificates be changed regularly for different sports events or concerts. That is, frequent change of the certificate number may be used to reduce unauthorized access.

In one embodiment, obtaining the first digital certificates of the local environment may be accomplished by first capturing the image at the local environment, encoding the image, and sending the encoded image to the application server. It should be noted that the encoding step can be deemed an optional step, where the captured image can be sent without encoding. For example, the image can be an image of the local physical location, or alternatively, the image can be an image presented to the customer by the local electronic device, e.g., an image displayed on a display of the local electronic device. This additional requirement may be important to a particular application where the physical presence of the customer at the local environment is required and confirmed (e.g., comparing the captured image with a stored image) before the certificate will be sent to the customer. For example, different images are used at different departure gates at the airport, or different images are used at different entrances to a large stadium, and so on. Furthermore, the image sent to the application server should be broadly interpreted to include an image that is derived from the image that was presented to the user. For example, the image presented to the user device could be a barcode, where an image derived from the barcode is sent to the application server and the image of the barcode itself is not sent.

It should be noted that techniques involving an image with visual information can also be implemented by using a recording with audio information, e.g., from recording of an announcement (broadly an audio signal) that is presented to the users, e.g., at different departure gates at the airport (e.g., a prerecorded announcement of "You are now at gate 101 of Terminal C at Liberty International Airport." Thus, different audio signals will be presented to the users at different gates and so on.

Furthermore, the present invention is not limited to the capturing of image information and audio information as discussed above. In one embodiment, it should be noted that a location based signal or information can be locally captured or derived. For example, a beacon signal that is broadcasted locally can be captured where the beacon signal is used to indicate the user's local position, i.e., (broadly a location based signal is indicative of the user's local position). This location based signal can then be sent to the application server. It should be noted that any radio location methodologies can be implemented.

Upon verification of the user physically at the local environment, the application server may then send the latest first digital certificate of the local environment to the user's mobile endpoint device. For example, the application server may first confirm that the request for the first digital certificate and the encoded image are received from a customer. The application server may then send the first digital certificate to the customer such that the customer is able to communicate with the electronic object located in the local environment via a secure and authenticated radio connection.

Although the present invention discloses the application server as being operated by the customer's network service provider, the present invention is not so limited. In other words, the application server can be operated by any third party that is trusted by the customer.

FIG. 2 illustrates an exemplary network 200 for providing radio communication with an electronic object in a local environment. The network 200 comprises a customer endpoint device 102 communicating with the core network 110 via an access network 201, e.g., a wireless access network such as a cellular access network, and a network element 111. The customer endpoint device 102 also communicates with an electronic object 230 located in a local environment 233. The local environment 233 is capable of communicating with the core network 110 via a network element 109. It should be noted that the connection between the local environment 233 and the core network 110 could be limited to the updating of information related to the first digital certificate. The electronic object 230 may not have a connection to the core network 110. Furthermore, within the local environment 233, the endpoint device 102 may have only a localized radio connection to the electronic object 230 and not be able to connect to the cellular network 201 or the core network 110. The core network 110 also comprises an application server 212 for supporting an application for providing radio communication with an electronic object in a local environment in a secure manner. For example, the network service provider enables local environments to communicate with the application server 212 to establish a trusted relationship which can then be utilized to authenticate local electronic objects deployed at the local environments. The network service provider also enables a customer to obtain digital certificates of the local environment that has established a trust relationship with the service provider.

In one embodiment, the information that will be transmitted to a local electronic device at the local environment can be optionally loaded in advance into the customer's mobile endpoint device 102. For example, a customer may have purchased an airline ticket for a flight to depart from a particular airport, or a ticket to a sports event to be held at a stadium. If the customer plans to access an electronic ticket processing system at the airport or at the stadium via the customer's mobile phone, then the electronic ticket information can be loaded into the customer's mobile phone. This avoids having to print the ticket by the customer.

In one embodiment, the customer endpoint device 102 receives a first digital certificate pertaining to a local environment from the customer's network service provider. For example, the customer endpoint device 102 may communicate with the application server 212 located in the core network 110 via the cellular access network 201, and receive a first digital certificate 240 of the local environment 233 from the application server 212. For example, the local environment 233 may have one or more public keys. The customer endpoint device 102 may then obtain the digital certificate containing the local environment's public key(s).

In operation, the customer mobile endpoint device 102 then receives a second digital certificate from at least one local electronic object 230a-n deployed at the local environment via radio communication. For the example above, the customer arrives at the local environment 233 and the customer mobile endpoint device 102 may detect a radio signal from the electronic object 230a-n deployed at the local environment.

The electronic object 230a-n may present its digital certificate (e.g., the second digital certificate 250) to the customer mobile endpoint device 102. For example, the customer's mobile endpoint device receives the second digital certificate as a means for verifying that the electronic object 230a-n has a trusted relationship with the local environment 233 and the local environment 233 has a trusted relationship with the network service provider. Namely, the first and second digital certificates are processed by the customer's mobile endpoint device to verify the trusted relationships. It should be noted that any mechanisms that correlate the first and second digital certificates can be implemented in the present invention, e.g., public key-private key pairing and the like. If the electronic object is successfully authenticated, then the customer may then interact with the electronic object. For example, the customer may submit an e-ticket to be processed by a ticket processing system deployed locally at the local environment.

Figure 3:
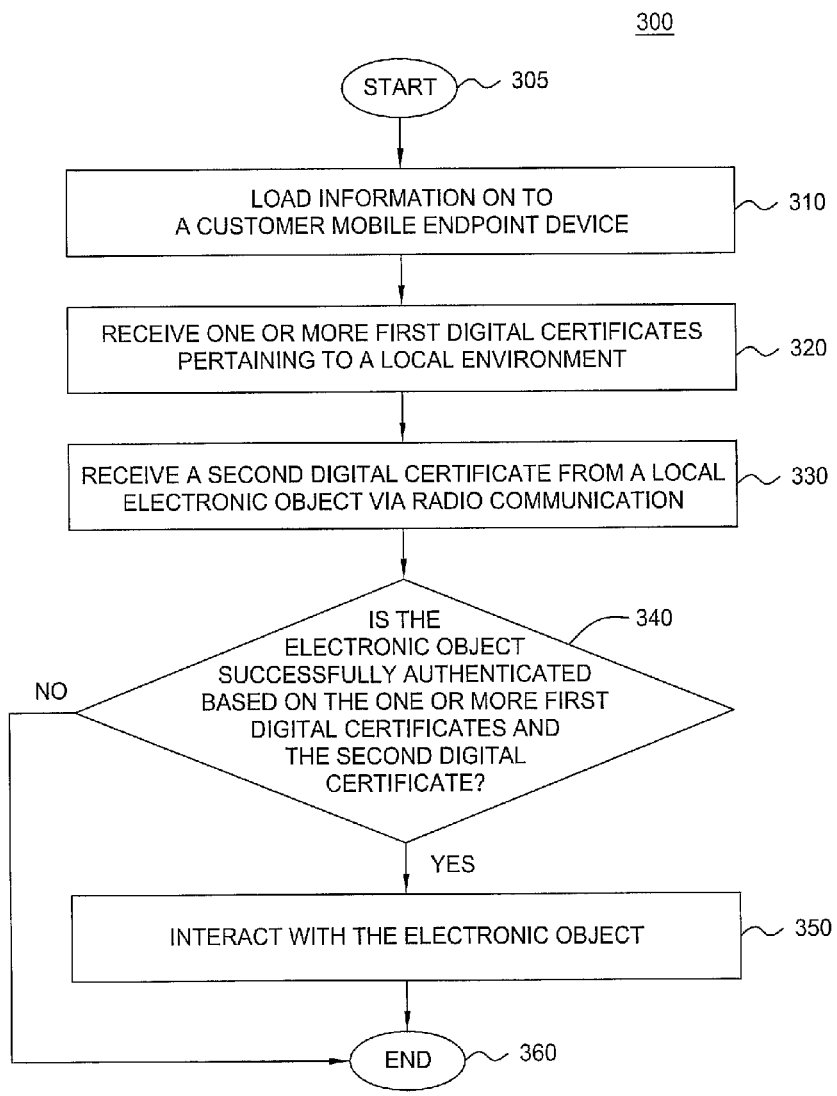
FIG. 3 illustrates a flowchart of a method for providing radio communication with an object in a local environment of the present invention.

FIG. 3 illustrates a flowchart of a method 300 for providing radio communication with an electronic object in a local environment. For example, one or more steps of method 300 can be implemented in a mobile endpoint device, wherein the mobile endpoint device is a device that communicates with a local electronic device in the local environment via a radio signal. Method 300 starts in step 305 and proceeds to step 310.

In optional step 310, method 300 loads information onto a customer mobile endpoint device. For example, electronic ticket information can be loaded into a customer's mobile phone, e.g., a smart phone.

In step 320, method 300 receives one or more first digital certificates pertaining to a local environment, e.g., from the customer's network service provider. For example, the customer's mobile endpoint device communicates with an application server located in the service provider's network via an access network, e.g., a cellular network, and receives the first digital certificate of the local environment from the application server. For example, the local environment may have one or more public keys. The customer's mobile endpoint device may then obtain the first digital certificate containing the local environment's public key.

In step 330, method 300 receives a second digital certificate from a local electronic object deployed at the local environment via radio communication. For the example above, the customer mobile endpoint device detects a radio signal from the electronic object deployed at the local environment, wherein the electronic object presents its digital certificate (i.e., the second digital certificate) to the customer via radio communication.

In step 340, method 300 determines if the electronic object is successfully authenticated based on the one or more first digital certificates and the second digital certificate. For example, the customer's mobile endpoint device processes the second digital certificate with the first digital certificate to determine whether the electronic object has a trusted relationship with the local environment. If the electronic object is successfully authenticated, the method proceeds to step 350. Otherwise, the method proceeds to step 360 to end processing the current certificates.

In step 350, method 300 interacts with the electronic object, e.g., providing the stored information in step 310 to the local electronic object for processing. For the example, the customer's mobile endpoint device may interact with an electronic gate agent or a check-in counter located at an airport. For example, the customer may submit an e-ticket to obtain a boarding pass, submit an e-ticket to gain entry to a stadium, or submit medical records to a hospital, and so on. The method then proceeds to step 360 to end processing the current certificates.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
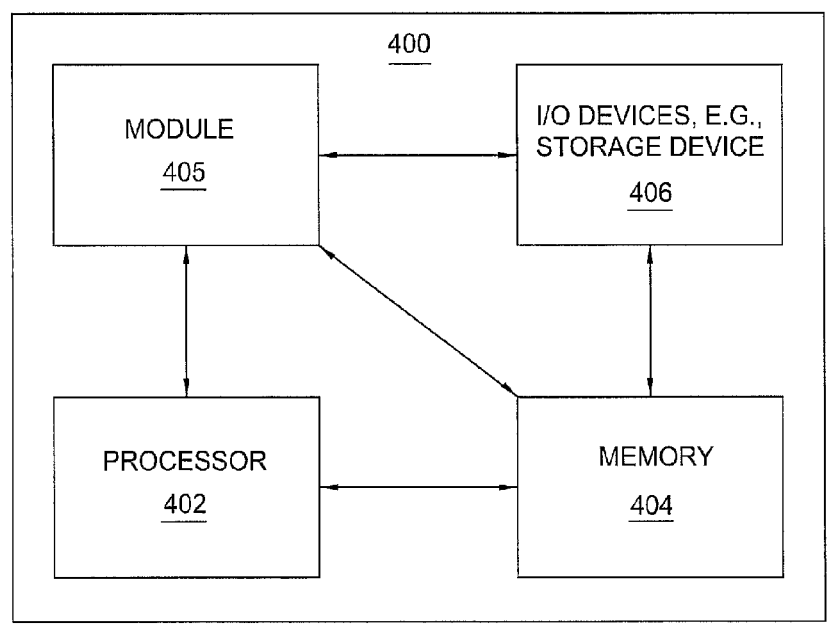
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing radio communication with an object in a local environment, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing radio communication with an object in a local environment can be loaded into memory 404 and executed by processor 402 to implement the functions as discussed above. As such, the present process 405 for providing radio communication with an object in a local environment (including associated data structures) of the present invention can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for communicating with an electronic device deployed in a local environment, the method comprising:
    receiving, by a mobile endpoint device of a user, a first digital certificate from a server of a communications network service provider of the mobile endpoint device, wherein the first digital certificate is associated with the local environment from a trusted source;
    receiving, by the mobile endpoint device, a second digital certificate from the electronic device deployed in the local environment via a wireless connection between the mobile endpoint device and the electronic device; and
    authenticating, by the mobile endpoint device, the electronic device using the first digital certificate and the second digital certificate when the mobile endpoint device attempts to communicate with the electronic device in the local environment, wherein the authenticating comprises correlating the first digital certificate and the second digital certificate as a public key-private key pair, wherein the first digital certificate comprises a public key of the public key-private key pair, wherein the second digital certificate comprises a private key of the public key-private key pair.

2. The method of claim 1, further comprising:
    interacting with the electronic device when the electronic device is successfully authenticated.

3. The method of claim 1, wherein the first digital certificate is provided by the communications network service provider of the mobile endpoint device that is remotely located from the local environment.

4. The method of claim 1, wherein the first digital certificate has a predetermined time period of validity.

5. The method of claim 1, wherein the second digital certificate has a predetermined time period of validity.

6. The method of claim 1, wherein prior to receiving the first digital certificate, the method further comprises:
    capturing an image at the local environment; and
    sending the image to the trusted source.

7. The method of claim 6, wherein the image is presented to the user by the electronic device.

8. The method of claim 6, wherein the trusted source uses the image as a confirmation before sending the first digital certificate.

9. The method of claim 1, wherein the first digital certificate is received before reaching the local environment.

10. The method of claim 1, wherein the first digital certificate is received in response to global positioning system information being provided to the trusted source.

11. A non-transitory computer-readable storage medium storing a plurality of instructions which, when executed by a processor of a mobile endpoint device of a user, cause the processor to perform operations for communicating with an electronic device deployed in a local environment, the operations comprising:
    receiving a first digital certificate from a server of a communications network service provider of the mobile endpoint device, wherein the first digital certificate is associated with the local environment from a trusted source;
    detecting a radio signal from the electronic device deployed in the local environment;
    receiving a second digital certificate from the electronic device deployed in the local environment via a wireless connection between the mobile endpoint device and the electronic device; and
    authenticating the electronic device using the first digital certificate and the second digital certificate when the mobile endpoint device attempts to communicate with the electronic device in the local environment, wherein the authenticating comprises correlating the first digital certificate and the second digital certificate as a public key-private key pair, wherein the first digital certificate comprises a public key of the public key-private key pair, wherein the second digital certificate comprises a private key of the public key-private key pair.

12. The non-transitory computer-readable storage medium of claim 11, wherein the operations further comprise:
    interacting with the electronic device when the electronic device is successfully authenticated.

13. The non-transitory computer-readable storage medium of claim 11, wherein the first digital certificate is provided by the communications network service provider of the mobile endpoint device that is remotely located from the local environment.

14. The non-transitory computer-readable storage medium of claim 11, wherein the first digital certificate and the second digital certificate have a predetermined time period of validity.

15. The non-transitory computer-readable storage medium of claim 11, wherein prior to receiving the first digital certificate, wherein the operations further comprise:
capturing an image at the local environment; and
sending the image to the trusted source.

16. The non-transitory computer-readable storage medium of claim 15, wherein the image is presented to the user by the electronic device.

17. The non-transitory computer-readable storage medium of claim 11, wherein the first digital certificate is received before reaching the local environment.

18. The non-transitory computer-readable storage medium of claim 11, wherein the first digital certificate is received in response to global positioning system information being provided to the trusted source.

19. A mobile endpoint device for communicating with an electronic device deployed in a local environment, the mobile endpoint device comprising:
a processor; and
a non-transitory computer-readable medium, storing a plurality of instructions which, when executed by the processor, cause the processor to perform operations, the operations compromising:
receiving a first digital certificate from a server of a communications network service provider of the mobile endpoint device, wherein the first digital certificate is associated with the local environment from a trusted source;
receiving a second digital certificate from the electronic device deployed in the local environment via a wireless connection between the mobile endpoint device and the electronic device; and
authenticating the electronic device using the first digital certificate and the second digital certificate when the mobile endpoint device attempts to communicate with the electronic device in the local environment, wherein the authenticating comprises correlating the first digital certificate and the second digital certificate as a public key-private key pair, wherein the first digital certificate comprises a public key of the public key-private key pair, wherein the second digital certificate comprises a private key of the public key-private key pair.

20. The mobile endpoint device of claim 19, wherein prior to receiving the first digital certificate, the operations further comprise:
capturing an image at the local environment; and
sending the image to the trusted source.

\* \* \* \* \*